US008550311B2

(12) United States Patent
Cornet et al.

(10) Patent No.: US 8,550,311 B2
(45) Date of Patent: Oct. 8, 2013

(54) ATTACHMENT DEVICE FOR ATTACHING A PUMP ON A TANK AND DISPENSER USING SUCH AN ATTACHMENT DEVICE

(75) Inventors: Gérard Cornet, Blaru (FR); Alain Behar, Suresnes (FR)

(73) Assignee: Aptar France SAS, Le Neubourg (FR)

( * ) Notice: Subject to any disclaimer, the term of this patent is extended or adjusted under 35 U.S.C. 154(b) by 631 days.

(21) Appl. No.: 12/602,048

(22) PCT Filed: May 23, 2008

(86) PCT No.: PCT/FR2008/050895
§ 371 (c)(1),
(2), (4) Date: May 10, 2010

(87) PCT Pub. No.: WO2008/152282
PCT Pub. Date: Dec. 18, 2008

(65) Prior Publication Data

US 2010/0243678 A1 Sep. 30, 2010

(30) Foreign Application Priority Data

May 29, 2007 (FR) ...................................... 07 55309

(51) Int. Cl.

| | |
|---|---|
| ***B65D 88/54*** | (2006.01) |
| ***B65D 5/72*** | (2006.01) |
| ***B65D 25/40*** | (2006.01) |
| ***B65D 35/38*** | (2006.01) |
| ***G01F 11/00*** | (2006.01) |
| ***B67B 1/00*** | (2006.01) |

(52) U.S. Cl.
USPC ...................... 222/321.9; 222/153.1; 222/570

(58) Field of Classification Search
USPC ........ 222/321.9, 153.01, 321.1, 321.7, 383.1, 222/372
See application file for complete search history.

(56) References Cited

U.S. PATENT DOCUMENTS

| | | | | |
|---|---|---|---|---|
| 4,773,553 A | | 9/1988 | Van Brocklin | |
| 4,951,842 A | * | 8/1990 | Ruscitti et al. | 222/321.9 |
| 4,984,702 A | * | 1/1991 | Pierpont | 215/272 |
| 5,562,219 A | * | 10/1996 | de Pous et al. | 215/274 |
| 5,642,908 A | * | 7/1997 | Mascitelli | 285/148.19 |
| 5,799,810 A | * | 9/1998 | de Pous et al. | 215/274 |
| 6,206,246 B1 | * | 3/2001 | Bougamont et al. | 222/321.9 |
| 6,273,303 B1 | * | 8/2001 | de Pous et al. | 222/402.1 |

(Continued)

FOREIGN PATENT DOCUMENTS

| | | |
|---|---|---|
| EP | 0 806 248 A1 | 11/1997 |
| FR | 2 815 610 A1 | 4/2002 |

(Continued)

*Primary Examiner* — Paul R Durand
*Assistant Examiner* — Vishal Pancholi
(74) *Attorney, Agent, or Firm* — Sughrue Mion, PLLC

(57) ABSTRACT

A fastener device (1, 2) for fastening a dispenser member (4) on a reservoir neck (51), the device comprising: a ring (1) forming an annular bearing collar (10) for coming to bear against the top (52) of the neck (51), with a gasket (3) possibly being interposed therebetween, and a skirt (11) including a free bottom end (145) and a deformable fastener section (13) that is deformed by thrust on the free end; and a hoop (2) that surrounds the skirt (11) of the ring (1) and constrains the fastener section (13) to deform inwards into contact with the neck (51); the device being characterized in that the deformable fastener section (13) is separated from the free end (145) by a substantially non-deformable bottom section (14) that is in engagement with the hoop (2).

18 Claims, 2 Drawing Sheets

(56) References Cited

U.S. PATENT DOCUMENTS

| | | | | |
|---|---|---|---|---|
| 6,371,333 | B2 * | 4/2002 | Lorscheidt et al. | 222/321.9 |
| 6,394,318 | B1 * | 5/2002 | Klodzinski | 222/321.7 |
| 6,463,650 | B1 * | 10/2002 | Bougamont et al. | 29/453 |
| 6,571,991 | B2 * | 6/2003 | Jourdin | 222/321.9 |
| 6,595,395 | B2 * | 7/2003 | Jourdin et al. | 222/321.9 |
| 6,672,488 | B2 * | 1/2004 | de Pous | 222/321.9 |
| 7,207,452 | B2 * | 4/2007 | Jourdin | 215/274 |
| 2002/0125270 | A1 * | 9/2002 | de Pous et al. | 222/153.09 |
| 2003/0205591 | A1 | 11/2003 | Garcia et al. | |
| 2005/0061834 | A1 * | 3/2005 | Garcia et al. | 222/321.7 |
| 2006/0081655 | A1 * | 4/2006 | Beranger et al. | 222/321.9 |
| 2008/0105643 | A1 * | 5/2008 | Milian et al. | 215/272 |

FOREIGN PATENT DOCUMENTS

| | | | |
|---|---|---|---|
| WO | 00/41951 | A1 | 7/2000 |
| WO | 2004/043613 | A2 | 5/2004 |
| WO | WO2007/042701 | A1 * | 4/2007 |

* cited by examiner

ATTACHMENT DEVICE FOR ATTACHING A PUMP ON A TANK AND DISPENSER USING SUCH AN ATTACHMENT DEVICE

FIELD OF THE INVENTION

The present invention relates to a fastener device for fastening a dispenser member, such as a pump or a valve, on the neck of a reservoir. The invention also relates to a fluid dispenser implementing such a fastener device. In the fields of perfumery, cosmetics, and pharmacy, fluids are often packaged in dispensers that comprise a reservoir and a dispenser member in the form of a pump, a valve, or any dispenser head. In order to fasten the dispenser member on the reservoir, in general at a neck, it is known to use fastener devices for fastening the dispenser member in leaktight and advantageously permanent manner on the neck of the reservoir.

BACKGROUND

Document FR 2 815 610 describes a fastener device comprising a ring and a hoop. The ring receives the pump or the valve in stationary manner, and includes a peripheral skirt for coming into engagement with the outside of the neck of the reservoir that forms an outer annular reinforcement that defines a bottom rim that serves as a fastener zone for the skirt. To do this, the skirt includes a plurality of tabs that each define a deformation zone that is adapted to deform radially inwards below the bottom rim of the neck. To achieve the deformation, it is necessary to exert axial pressure on the bottom free ends of the tabs. In practice, the bottom ends of the tabs come to bear against a shoulder of the reservoir, situated at the base of the neck. In other words, the skirt bears against the shoulder, and by exerting axial pressure on the ring, the deformation zone deforms radially inwards below the rim of the neck. In order to guarantee that the deformation zones of the tabs do deform inwards, the hoop is used that surrounds the skirt of the ring. In other words, the hoop prevents the tabs of the skirt from deforming outwards. However, the deformation zone of the tabs include two hinged connection pieces so that the bottom sections of the tabs pivot inwards while the skirt is deforming. It can thus be said that the deformation zone extends over the entire bottom portion of the tabs. Thus, the skirt comes into contact with the hoop only at certain points at its bottom end. Unfortunately, such point contact does not suffice to hold the ring firmly inside the hoop, most particularly at its bottom end. Tests have made it possible to see this weakness in the fastener device: by pulling on the hoop, it is possible to remove the fastener device from the neck, enabling the bottom section of the ring to return substantially to its non-deformed original position. It was quickly concluded that that retention fault results from the bottom section of the ring being poorly fastened inside the hoop. It is necessary to keep firmly in mind that such a fastener device is for ensuring that the dispenser member is fastened not only in leaktight manner, but also in permanent manner, on or in the neck of the reservoir.

CERTAIN OBJECTS OF THE INVENTION

An object of the present invention is to solve the above-mentioned drawback of the fastener device of the prior art. To do this, the present invention proposes a fastener device for fastening a dispenser member on a reservoir neck, the device comprising: a ring forming an annular bearing collar for coming to bear against the top of the neck, with a gasket possibly being interposed therebetween, and a skirt including a free bottom end and a deformable fastener section that is deformed by axial thrust on the free end; and a hoop that surrounds the skirt of the ring and constrains the fastener section to deform inwards into contact with the neck; the device being characterized in that the deformable fastener section is separated from the free end by a substantially non-deformable bottom section that is in engagement with the hoop. Thus, it is possible to hold the bottom section of the skirt inside the hoop in solid and permanent manner. This stable and permanent retention guarantees that the fastener section is deformed in stable and permanent manner. The fastener section may be held in the hoop by any known technique, e.g. by radial clamping, by snap-fastening, by barbs, by crimping, by screw-fastening, by heat-sealing, by adhesive, etc.

Advantageously, the bottom section is substantially cylindrical. In a practical embodiment, the bottom section may form a non-deformable continuous cylindrical cylinder that is connected at its top to the fastener zone, and that defines at its bottom the free bottom end of the skirt. The bottom section differs from the above-mentioned prior art in that it is, and remains, cylindrical while the fastener zone is being deformed, since it is non-deformable or substantially non-deformable. In the prior art, the bottom section pivots inwards so that only the free bottom end of the skirt remains in contact with the hoop. In the present invention, the hoop may come into contact with the bottom section at a zone that is cylindrical, and not only annular.

In another advantageous aspect of the invention, the hoop and the bottom section form axial retaining means for blocking the ring in the hoop, with the deformed fastener zone. Advantageously, the hoop forms at least one retaining profile that is suitable for being received housed below at least one retaining rib that is formed by the bottom section of the ring.

In a practical embodiment, the retaining profile may be formed by an inside edge of an end portion of the hoop that is turned up inwardly. In addition, the bottom section may form a plurality of retaining ribs that are axially offset. It should be observed that the axial retaining means may be implemented in a fastener device that does not include a non-deformable bottom section. By way of example, it is possible to envisage that the axial retaining means make it possible to hold the skirt in stable and permanent manner in the hoop, solely at the bottom end of the skirt. By way of example, provision can be made for the hoop to snap-fasten below the bottom end of the skirt. It is specifically such axial retaining means that are missing in the above-mentioned prior-art document for ensuring that the ring is held in stable and permanent manner inside the hoop. Naturally, by providing a substantially non-deformable bottom section, the axial retaining means are correspondingly more effective, and they make it possible for the bottom section to be held over its entire height, and not just at its free bottom end. In very general manner, the term rib should be understood to mean any surface state that makes it possible for the retaining profile of the hoop to be held in stable and permanent manner.

According to another advantageous characteristic of the invention, the fastener section may present an outside diameter that is greater than the inside diameter of the hoop so as to constrain the fastener section to deform inwards. Thus, passing the hoop over the fastener section makes it possible to start, and thus to impose, inward deformation of the section.

In another advantageous aspect, the bottom section may present an outside diameter that is greater than the inside diameter of the hoop so as to create a tight radial fit. Thus, the hoop and the ring may constitute a single unit, not only when the fastener section is deformed, but also before said section is deformed, in particular during transport and delivery of the fastener device. Advantageously, the skirt includes a top section that is connected at its bottom to the fastener section, the top section presenting an outside diameter that is less than the outside diameters of the fastener section and of the bottom section. Consequently, clamping between the ring and the hoop is looser at the top section of the skirt and advantageously of the ring, thereby making it easier to mount the hoop on the ring.

In a practical embodiment, the fastener section comprises a plurality of fastener elements each comprising two bars that are interconnected via a central hinged connection piece, and that are connected to the bottom section via a bottom hinged connection piece and to a top section of the skirt via a top hinged connection piece, the bars and the central connection piece moving radially inwards while the fastener section is being deformed. Advantageously, the fastener elements are separated by slots or are connected by a flexible web. Naturally, this embodiment should not be considered as the only possible embodiment: it is entirely possible to envisage other configurations for guaranteeing that a portion of the skirt is deformed below the rim of the neck, thereby making it possible to ensure that the fastener device is fastened in leaktight, stable, and advantageously permanent manner on the reservoir.

The invention also defines a fluid dispenser comprising: a reservoir forming a shoulder from which there extends a neck, said neck being provided with reinforcement that projects radially outwards in such a manner as to define a bottom rim that extends inwards so as to join a narrow portion of the neck that is connected on the shoulder; a dispenser member, such as a pump or a valve, mounted on the neck; and a fastener device as defined above, the fastener section being deformed inwards below the rim, with the bottom free end of the skirt bearing against the shoulder. Advantageously, the bottom section is static relative to the neck while the fastener section is being deformed. This is in contrast to the above-mentioned prior-art dispenser device in which the bottom section, formed with tabs, is deformed by pivoting inwards in such a manner as to take on a generally frustoconical shape.

In the present invention, the bottom section is moved axially in translation relative to the top section of the ring by the fastener section being deformed. The axial retaining means for axially retaining the ring in the hoop not only ensure that the hoop is properly fastened on the ring, but also guarantee the deformed final position of the fastener section, in contrast to most prior-art fastener devices. The axial retaining means of the invention may be implemented on any type of fastener device of that kind, e.g. the fastener device described in the prior-art document. However, it is preferable, and much easier technically, to implement the axial retaining means in combination with a non-deformable bottom section that is advantageously cylindrical.

BRIEF DESCRIPTION OF THE FIGURES

The invention is described more fully below with reference to the accompanying drawings which show an embodiment of the invention by way of non-limiting example.

In the figures.

DETAILED DESCRIPTION OF NON-LIMITING EMBODIMENTS

Figure 1:
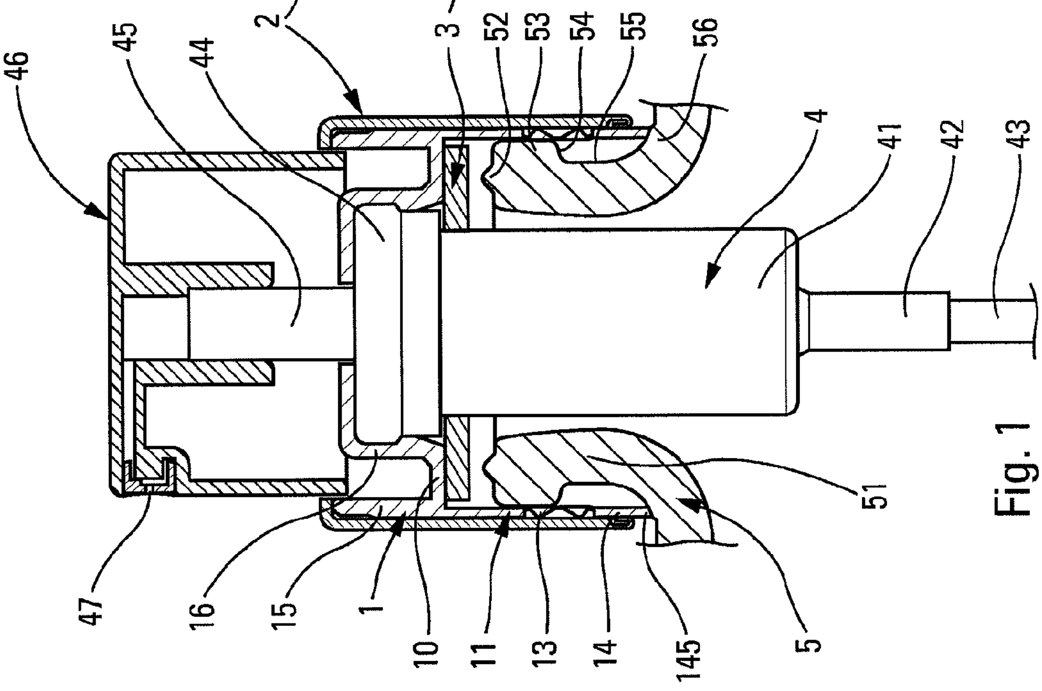
FIG. 1 is a view partially in vertical section through the top portion of a fluid dispenser implementing a fastener device constituting an embodiment of the invention, in an initial state just before the fastener section is deformed.

Reference is made firstly to FIG. 1 in order to describe all of the component elements of a fluid dispenser constituting a non-limiting embodiment of the invention. The dispenser comprises a ring 1, a hoop 2, a neck gasket 3, a dispenser member 4, and a reservoir 5. The ring 1 and the hoop 2 co-operate with each other to form a fastener device that makes it possible to fasten the dispenser member 4 in stable, leaktight, and preferably permanent manner on the reservoir 5.

The reservoir 5 includes a body (not shown) forming a working volume for being filled with fluid, e.g. a perfume, a cosmetic cream, or a pharmaceutical. The fluid may be a liquid or a powder. The reservoir 5 includes a neck 51 that extends upwards from a shoulder 56 that forms the top portion of the body (not shown) of the reservoir. The neck 51 includes a top annular edge 52 that may advantageously be formed with a sealing ridge. The neck also includes annular reinforcement 53 that projects radially outwards. The reinforcement 53 thus forms a bottom rim 54 that extends inwards so as to join a narrow portion 55 of the neck that is then connected to the shoulder 56. This design for a reservoir neck is fairly conventional in the fields of perfumery, cosmetics, or even pharmacy. In general, this type of reservoir is made of glass or made of plastics material.

The dispenser member 4 may be of any kind, but advantageously it is a pump or a valve that is actuated manually in an axial direction. Naturally, in place of a pump or a valve, it is also possible to provide a more simple dispenser member in the form of a dispenser orifice that is optionally fitted with an outlet valve. When the dispenser member is a pump or a valve, said dispenser member generally includes a body 41 that forms, at its bottom end, an inlet 42 that is advantageously provided with a dip tube 43. At its top end, the body 41 forms a fastener flange 44 for co-operating with the ring 1, as described below. The pump or the valve also includes an actuator rod 45 that is axially movable down and up inside the body 41. The top free end of the rod 45 is covered by a pusher 46 that advantageously forms a dispenser orifice 47 for the fluid coming from the pump or the valve. Very generally, by pressing axially on the pusher 46, the pump or the valve dispenses (optionally meters out) the fluid extracted from the reservoir 5 via the dip tube 43. The fluid may be dispensed in the form of a spray, a thread, a bead, or knobs. This design for a pump or a valve is fairly conventional in the fields of perfumery, cosmetics, or even pharmacy.

In this embodiment, the fastener device is constituted merely by the ring 1 and the hoop 2. In general, the ring 1 is made of plastics material, whereas, in general, the hoop 2 is made of metal, although plastics material can also be used. The ring and the hoop are circularly symmetrical.

The ring 1 includes an annular bearing collar 10 for coming into direct leaktight contact with the top edge 52 of the neck, or preferably flattens an annular neck gasket 3 on the top edge of the neck. Either way, the collar 10 makes it possible to ensure sealing at the top edge 52 of the neck. The ring also includes a reception housing 16 for receiving the flange 44 of the body 41 of the dispenser member 4. By way of example, the flange 44 may be received by snap-fastening inside the reception housing 16. In conventional manner, the housing 16 includes a central opening through which the actuator rod 45 extends. The ring also includes a fastener skirt 11 of shape that is very generally cylindrical. The skirt 11 extends downwards from the outer periphery of the collar 10. In the embodiment used to illustrate the invention, the ring also includes a cylindrical bushing 15 that extends upwards from the outer periphery of the collar 6, in register with the skirt 11.

Figure 2:
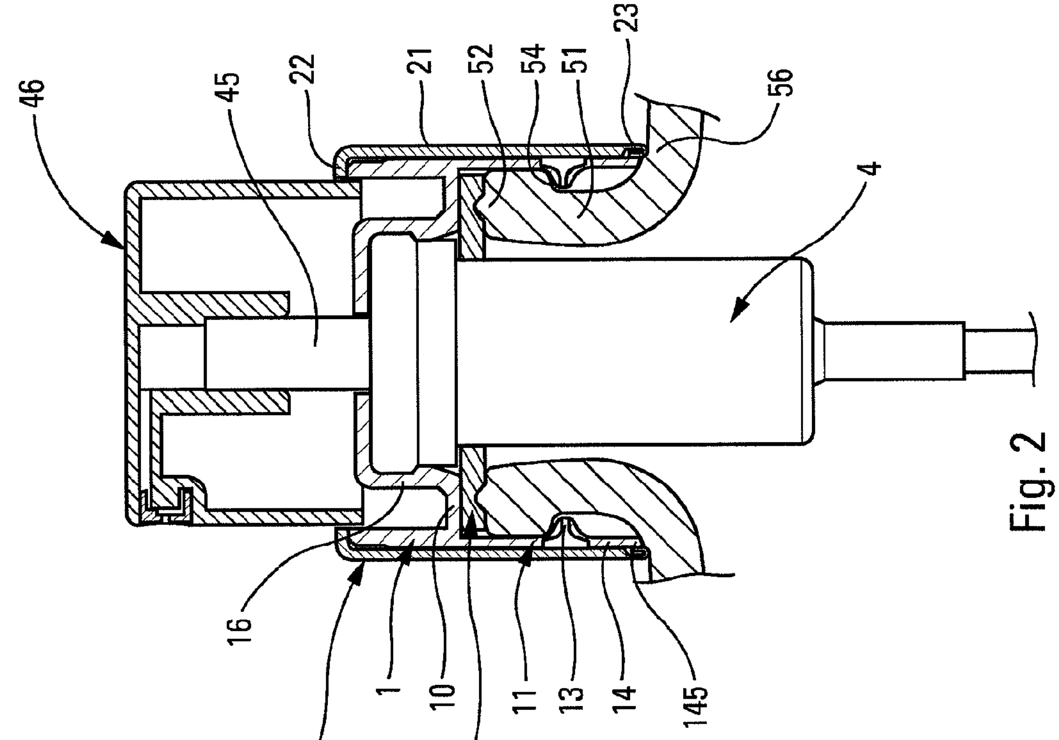
FIG. 2 is a view similar to the view in FIG. 1, in a final mounting state with the fastener section deformed.
Figure 3:
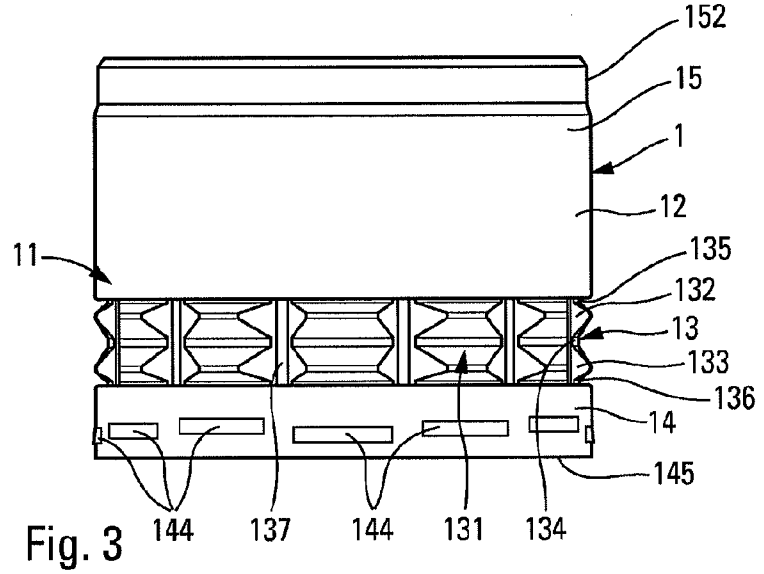
FIG. 3 is an elevation view of the ring of the fastener device of the invention.
Figure 4:
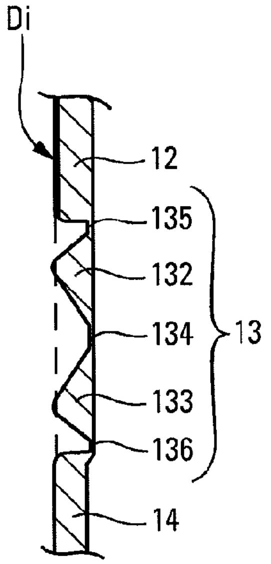
FIG. 4 is a vertical section view of a portion of the ring in FIG. 3, shown on a much larger scale.
Figure 5A:
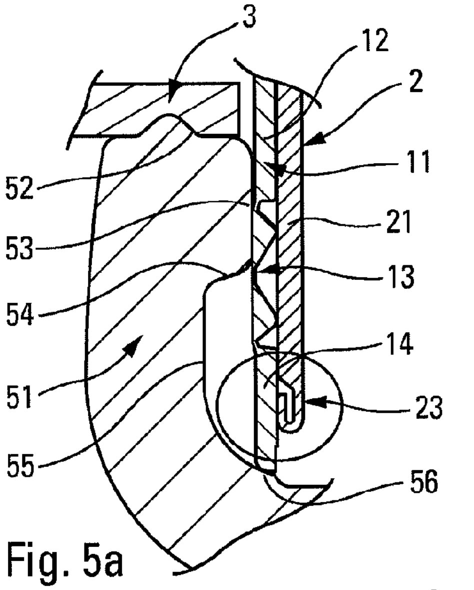
FIG. 5*a* is a large-scale vertical section view of a detail of FIG. 1.

With reference below to all of the figures, it can be seen that the skirt 11 comprises a top section 12 that is connected to the collar 10, a fastener section 13 that extends downwards in register with the top section 12, and a bottom section 14 that extends downwards in register with the fastener section 13. In the invention, the top and bottom sections 12 and 14 are substantially, relatively, or completely non-deformable, whereas the fastener section 13 is radially deformable towards the inside of the ring, i.e. towards its axis of revolution. In FIGS. 1, 3, 4, and 5*a*, the fastener section 13 is in its non-deformed initial state, whereas in FIGS. 2 and 6*a*, the fastener section 13 is in its deformed final state. It can thus be said that the fastener section 13 is generally cylindrical in its non-deformed initial state, and projects radially inwards in its deformed state. With reference to FIG. 3, it can be seen that the deformable fastener section 13 comprises a plurality of fastener elements 131 that are disposed side by side around the periphery of the skirt 11. Each fastener element is formed by two hinged bars 132 and 133 having a cross-section that is substantially triangular, in this embodiment. The top bar 132 is connected to the bottom bar 133 via a central hinged connection piece 134. In addition, the top bar 132 is connected to the top section 12 via a hinged connection piece 135. In symmetrical manner, the bottom bar 133 is connected to the bottom section 14 via a hinged connection piece 136. In accordance with an advantageous characteristic of the invention, it can clearly be seen in FIG. 4 that the maximum outside diameter of the fastener section 13, at the vertices of the bars 132 and 133, is greater than the outside diameter of the top zone 12. In addition, it can be seen that the outside diameter of the bottom section 14 is greater than the outside diameter of the top section 12. The advantage of the various diameters is explained below. In the embodiment in FIG. 3, the ring 1 thus includes twelve fastener elements 131 that together form the fastener section 13. The fastener elements 131 may be separated by zones 137 that may be either slots or webs of flexible material.

In the non-deformed initial state, the fastener section 13 is presented with its three hinged connection pieces 134, 135, and 136 in axial alignment. It can easily be understood that the fastener section 13 is deformed by pivoting the bars 132 and 133 about the hinged connection pieces. The connection piece 135 moves axially closer to the connection piece 136, whereas the connection piece 134 moves radially inwards, as described below.

The bottom section 14 is connected to the fastener section 13 via the hinged connection piece 136. According to an advantageous characteristic of the invention, the bottom section 14 is substantially, relatively, or completely non-deformable. If there is any deformation, it is merely momentary and elastic. In this embodiment, the bottom section 14 is in the form of a non-deformable cylindrical cylinder having an outside diameter that is advantageously slightly greater than the outside diameter of the top section 12. The bottom section is continuous over its entire periphery, unlike the skirt in document FR 2 815 610, which is slotted so as to form flexible tabs. The bottom section 14 forms a free annular bottom end 145 for coming into contact with the shoulder 56, as can be seen very clearly in FIGS. 5*a* and 6*a*. According to an advantageous characteristic of the invention, the outside wall of the bottom section 14 is provided with a plurality of ribs 144 that are advantageously disposed in axially-offset manner. In FIG. 3, it can be seen that the ribs 144 define three different axial levels. Each axial level is defined by four ribs. The ribs 144 preferably present a profile in the form of a catch comprising a gentle slope, a sharp edge, and a steep wall. Such a profile enables fastening to be effective and irreversible. While the fastener section 13 is being deformed, the bottom section 14 moves axially in translation in static, non-deformed, and one-piece manner towards the top section 12, with the distance between the top and bottom sections 12 and 14 being reduced by the fastener section 13 deforming. As a result of its configuration, the fastener section 13 may be likened to a bellows or to a toggle that transforms an axial movement into a radial movement.

Figure 6A:
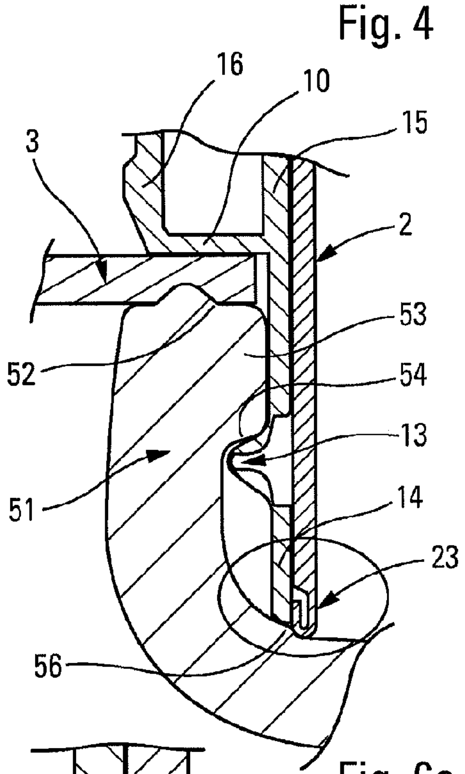
FIG. 6*a* is a large-scale view of a detail of FIG. 2.
Figure 5B:
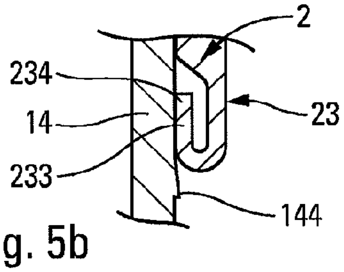
FIG. 5*b* is a larger-scale view of a detail of FIG. 5*a;*
Figure 6B:
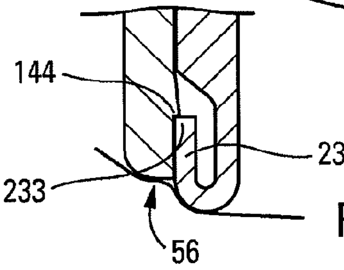
FIG. 6*b* is a larger-scale view of a detail of FIG. 6*a.*

The hoop 2 present a generally cylindrical configuration. It comprises a cylindrical main section 21, a top inwardly-directed rim 22, and a bottom end 23. The main section may have a configuration other than cylindrical, in some circumstances. The inwardly-directed rim 22 is for coming into contact with the top edge of the bushing 15, as can be seen in FIGS. 1 and 2. The inside wall of the hoop is for coming into contact with the ring, most particularly at its skirt 11. Advantageously, the inside diameter Di of the main section 21 is equal to, or slightly greater than, the outside diameter of the top section 12 of the skirt. In contrast, the inside diameter Di of the main section is slightly smaller than the maximum outside diameter of the fastener section 13 and/or of the bottom section 14, as can be seen clearly in FIG. 4. Thus, clamping between the hoop and the top section 12 is loose, whereas it is tight at the bottom section 14. In addition, the hoop makes it possible to urge the bars 132 and 133 inwards a little, so as to start, and thus impose, the inward direction of deformation for the fastener section. At its bottom end 23, the hoop forms an end portion 233 that is turned up inwardly. The end portion 233 thus forms an inside edge 234 that points inwards and upwards. The edge serves as a retaining profile that co-operates with the ribs 144 of the bottom section 14 that act as retaining ribs. The edge 234 co-operates with the ribs 144 to form axial retaining means that make it possible to block effectively, and advantageously in permanent manner, the ring in the hoop, and more precisely the bottom section 14 in the hoop. In FIGS. 2 and 6*a*, and more particularly in FIG. 6*b*, the edge 234 of the hoop can be seen snap-fastened below the rib 144. Naturally, in place of the turned-up end portion 233, it is possible to provide any type of profile, e.g. machined, molded, embossed, etc., that makes it possible to hold the hoop in stable and preferably permanent manner at the bottom section 14. In symmetrical manner, in place of the ribs 144, it is possible to provide any profile, projection, bead, or recess, that makes it possible to engage in stable and preferably permanent manner in the hoop 2.

With the detail of the structure of the various component elements of a dispenser of the invention described above, there follows a description of a complete cycle of mounting a fastener device of the invention on a reservoir neck. Reference is made more particularly to FIGS. 5*a*, 5*b*, 6*a*, and 6*b* that show in greatly enlarged detail, the pertinent characteristics of the invention. The fastener device is preferably pre-mounted or pre-assembled in the configuration shown in FIGS. 1 and 5*a*. The hoop 2 is thus engaged around the ring 1 in such a manner that the inwardly-directed rim 22 comes to bear against the top end of the bushing 15. The fastener section 13 is thus also substantially cylindrical, the bottom end 23 of the hoop already being positioned around the non-deformable bottom section 14. The first operation consists in mounting the dispenser member 4 in the reception housing 16. Then, the neck gasket 3 is put into place below the collar 10 by clamping around the body 41 of the dispenser member. The following step consists in engaging the body 41 of the dispenser member inside the neck 51, and in engaging the skirt 11 of the ring around the neck 51. The free bottom end 145 of the ring thus comes to bear against the shoulder 56 of the neck, as can be seen very clearly in FIG. 5*a*. The fastener section 13 is still not deformed.

Thus, by exerting an axial thrust force, either on the inwardly-directed rim 22 of the hoop, or on the pusher 46, the bottom end 145 of the skirt is pressed hard against the shoulder 56 of the neck. By continuing to press, the fastener section 13 deforms inwards, below the rim 54 of the reinforcement 53 of the neck 51. The deformation of the section 13 requires the bottom section 14 to slide axially inside the hoop 2. This can be seen clearly on comparing FIGS. 5*a* and 6*a*. Thus, the bottom end 23 of the hoop slides downwards over the bottom section 14 that remains static and not deformed relative to the neck 51. The final mounting position is reached when the edge 234 becomes housed below one of the ribs 144 of the bottom section 14. The fastener section 13 is thus deformed in its final position by pressing the top bar 132 hard against the bottom rim 54 of the neck. This can be seen in FIG. 6*a*. As a result of the bottom section 14 being held in stable and permanent manner in the hoop 2, the fastener section 13 is deformed in permanent manner. In addition, the fastener section 13 is deformed more easily as a result of its deformation being started by the hoop urging the bars inwards a little as a result of the various different diameters as explained above. During deformation, the hinged connection piece 134 is moved radially inwards, with said movement being accompanied by the bars 132 and 133 pivoting about their respective hinged connection pieces 135 and 136.

It should be observed that the bottom section 14 is not necessarily cylindrical: it could present a stepped shape or even a bullet shape, for example. The non-deformability of the bottom section 14 is an advantageous characteristic that is not however indispensable for implementing the axial retaining means that make it possible to block the bottom section effectively in the hoop.

By means of the invention, it is possible to pre-mount the hoop on the ring almost completely, before mounting on the reservoir neck. The relative movement between the hoop and the bottom portion 14 of the ring lies in the range only a few tenths of a millimeter to one to two millimeters. It is thus possible for the fastener section 13 to pass beyond the annular reinforcement 53 of the neck, with the hoop being already engaged around the fastener section.

The invention claimed is:

1. A fastener device for fastening a dispenser member on a reservoir neck, the device comprising:

a ring forming an annular bearing collar for coming to bear directly or indirectly against a top of the neck, and a skirt including a free bottom end and a deformable fastener section that is deformed by axial thrust on the free end;

a hoop that surrounds the skirt of the ring and constrains the fastener section to deform inwards into contact with the neck; and the deformable fastener section is separated axially from the free end by a substantially non-deformable bottom section that defines a cylindrical surface that is in engagement with the hoop;

wherein the cylindrical surface is a continuous cylinder.

2. A fastener device according to claim 1, wherein the bottom section is substantially cylindrical.

3. A fastener device according to claim 1, wherein the bottom section forms a non-deformable continuous cylindrical cylinder that is connected at its top to the fastener zone, and that defines at its bottom the free bottom end of the skirt.

4. A fastener device according to claim 1, wherein the hoop and the bottom section form axial retaining means for blocking the ring in the hoop, with the deformed fastener zone.

5. A fastener device according to claim 4, wherein the hoop forms at least one retaining profile that is suitable for being received below at least one retaining rib that is formed by the bottom section of the ring.

6. A fastener device according to claim 5, wherein the retaining profile is formed by an inside edge of an end portion of the hoop that is turned up inwardly.

7. A fastener device according to claim 5, wherein the bottom section forms a plurality of retaining ribs that are axially offset.

8. A fastener device according to claim 1, wherein the fastener section presents an outside diameter that is greater than the inside diameter of the hoop so as to constrain the fastener section to deform inwards.

9. A fastener device according to claim 1, wherein the bottom section presents an outside diameter that is greater than the inside diameter of the hoop so as to create a tight radial fit.

10. A fastener device according to claim 1, wherein the skirt includes a top section that is connected at its bottom to the fastener section, the top section presenting an outside diameter that is less than the outside diameters of the fastener section and of the bottom section.

11. A fastener device according to claim 1, wherein the fastener section comprises a plurality of fastener elements each comprising two bars that are interconnected via a central hinged connection piece, one bar being connected to the bottom section via a bottom hinged connection piece and the other bar being connected to a top section of the skirt via a top hinged connection piece, the bars and the central connection piece moving radially inwards while the fastener section is being deformed.

12. A fastener device according to claim 11, wherein the fastener elements are separated by slots or are connected by a flexible web.

13. A fluid dispenser comprising:

a reservoir forming a shoulder from which there extends a neck, said neck being provided with reinforcement that projects radially outwards in such a manner as to define a bottom rim that extends inwards so as to join a narrow portion of the neck that is connected on the shoulder;

a dispenser member mounted on the neck; and a fastener device according to claim 1, the fastener section being deformed inwards below the rim, with the bottom free end of the skirt bearing against the shoulder.

14. A dispenser according to claim 13, wherein the bottom section is static relative to the neck while the fastener section is being deformed.

15. The dispenser according to claim 13, wherein the dispenser member is a pump or a valve.

16. The fastener device according to claim 1, wherein the annular bearing collar is configured to bear against the top of the neck through an intervening gasket.

17. A fastener device for fastening a dispenser member on a reservoir neck, the device comprising:

a ring defining an axis of revolution extending in an axial direction and forming an annular bearing collar configured to bear directly or indirectly against a top of the neck, and a skirt having a free bottom end and a deformable fastener section that is deformed by thrust in the axial direction on the free end;

a hoop dimensioned to surround the skirt of the ring and to constrain the fastener section to deform radially inwards into contact with the neck when the thrust is applied to the free end; and the deformable fastener section is separated in the axial direction from the free end by a distance measured in the axial direction by a substantially non-deformable bottom section that is in engagement along a cylindrical surface with the hoop, the substantially non-deformable bottom section having a length in the axial direction that defines the cylindrical surface configured to slide against an opposing cylindrical surface of the constraining hoop while the deformable fastener section deforms radially inwards, the cylindrical surface of the substantially non-deformable bottom section configured to remain in abutment against the opposing cylindrical surface of the hoop after the deformable fastener section deforms radially inwards; and wherein the cylindrical surface of the substantially non-deformable bottom section is a continuous cylinder.

18. The fastener device according to claim 17, wherein the cylindrical surface of the substantially non-deformable bottom section is configured to slide in abutment against the opposing cylindrical surface of the hoop after the deformable fastener section deforms radially inwards without pivoting of the substantially non-deformable bottom section about the free end.

* * * * *